June 16, 1931.  R. DE M. TAVEAU  1,810,192
PROCESS OF PREPARING ALKYL SULPHATES
Filed June 11, 1921   3 Sheets-Sheet 1

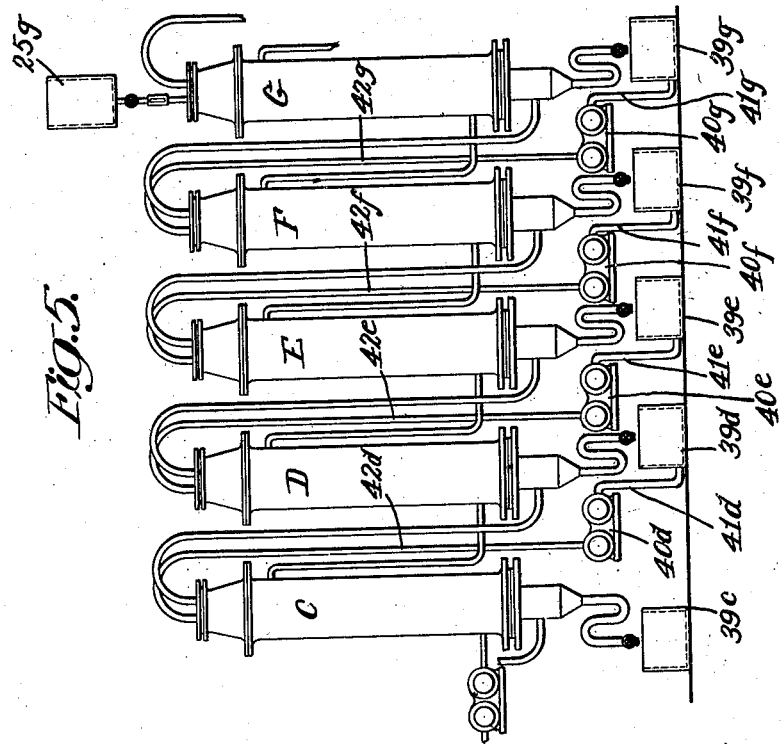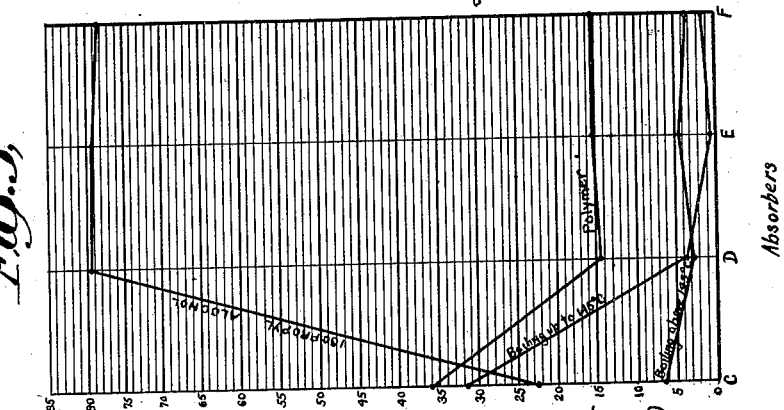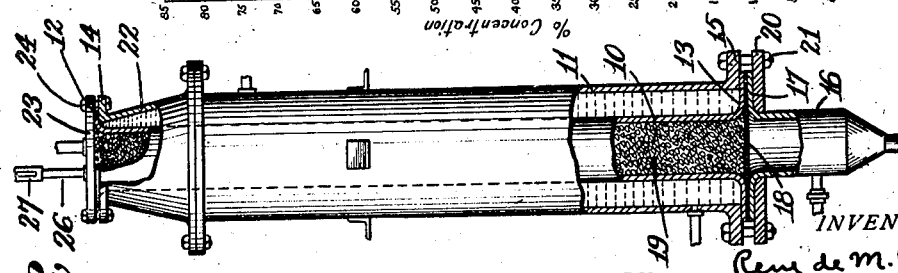

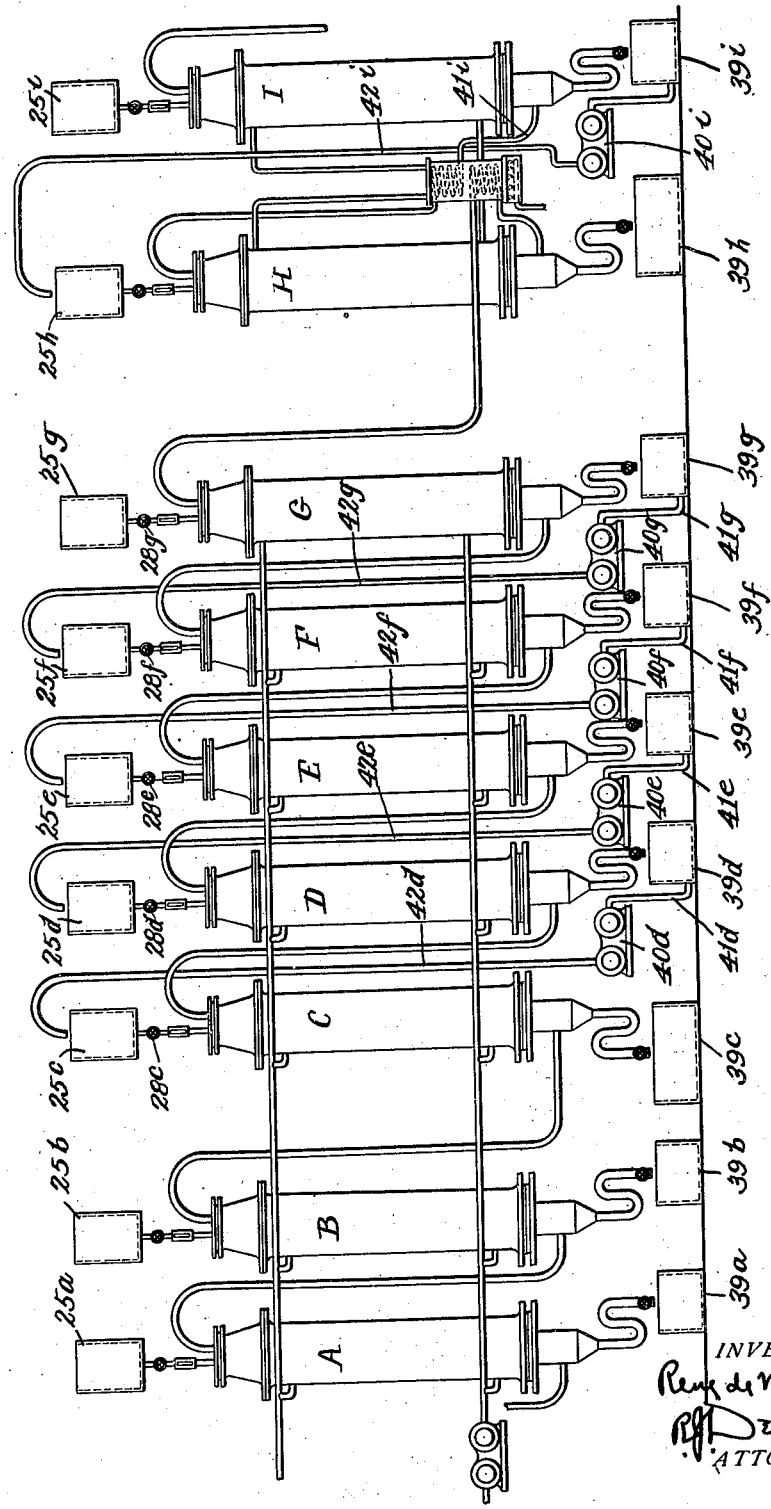

Patented June 16, 1931

1,810,192

UNITED STATES PATENT OFFICE

RENÉ DE M. TAVEAU, OF ELIZABETH, NEW JERSEY, ASSIGNOR, BY MESNE ASSIGNMENTS, TO THE TEXAS COMPANY, OF NEW YORK, N. Y., A CORPORATION OF DELAWARE

PROCESS OF PREPARING ALKYL SULPHATES

Application filed June 11, 1921. Serial No. 476,699.

This invention relates to the preparation from olefin-containing gases of acid liquor and products derived therefrom, and it has special reference to processes of and apparatus for manufacturing acid alkyl sulphates and derived alcohols, esters, acetone and the like from the unsaturated hydrocarbon compounds derived from petroleum oils, and contemplates in particular the utilization of olefins contained in the gases resulting from the destructive distillation or cracking of hydrocarbon oils, although other hydrocarbon sources such as illuminating gas, coke-oven gas and the like may be utilized.

The invention comprehends the treating of olefin-containing gases with sulphuric acid or other equivalent absorbing or extracting acid under definite concentrations and at predetermined temperatures so as to selectively combine or absorb the several olefin constituents to form acid alkyl sulphates corresponding to the olefins present. Sulphuric acid has a selective combining or extracting action on olefins, conditioned by the temperature and the strength or concentration of the acid employed, and according to the present invention, the gases are first given a mild treatment characterized by relatively weak acid and low temperatures and then progressively subjected to more severe conditions marked by stronger acid and higher temperatures. By this method of treatment, the unsaturated hydrocarbons contained in the gases are analytically combined and absorbed in the order of chemical affinity and at temperatures and acid-concentrations most favorable to the fixation of the respective olefins involved, whereby acid alkyl sulphates corresponding to the several olefins are produced. Thus, substantially all of the olefin content of the gases may be utilized and the desired acid liquor or acid alkyl sulphates obtained.

This acid liquor may then be treated and used in various ways to produce other desirable products derived therefrom, such, for example, as alcohols, esters, ketones, and the like. Applicant's method of treatment has a great industrial advantage in the preparation of alcohols, inasmuch as the analytical fixation of the several olefins makes possible a simple separation of the alcohol compounds produced, which cannot readily be separated by fractional distillation. Thus, for example, isopropyl alcohol, having a boiling point of 82.4° C. and tertiary butyl alcohol with a boiling point of 82.5° C. may easily be produced by the present process and isolated as separate products.

According to my invention the sulphating operation or absorption is carried on in such manner as to reduce as far as practicable the formation of products of condensation and polymerization, to segregate to a certain extent at least the products of polymerization and condensation, and to so control the reaction that a maximum yield of acid alkyl sulphates or other products may be realized.

The present process is adapted for treating either the gaseous or normally liquid olefins. When utilizing, for example, still gases derived from the destructive distillation of hydrocarbon oils, the gases often contain a greater or less proportion of condensable compounds, admixed therewith, such as amylene, hexylene, heptylene and even higher olefins. In such case, the normally liquid olefins contained in the gases as well as the gaseous constituents may be reacted with the acid under varying conditions to form acid alkyl sulphates of the respective olefins. Moreover, isolated and pure liquid olefin may also be utilized in accordance with the present invention by first passing or bubbling still gases or inert gases through the liquid olefins and contacting the resulting gases containing the volatilized liquid olefins with sulphuric acid in the manner already described.

In practicing the present invention, I prefer to employ a plurality of series-connected absorbing chambers through which the olefin-containing gases are passed in succession, the several chambers containing, or preferably receiving the percolation of sulphuric acid of various concentrations and being maintained at temperature conditions most suitable for the selective absorption or fixation of the olefin constituents in the order of their chemical affinity. When acid percolation is employed, it is desirable to pass the gases through the chambers in counter current relation to the percolation of the acid. By thus contacting the gases with the acid, acid alkyl sulphates, corresponding to these olefins are separately produced and may be collected at the bases of the chambers. The various chambers are maintained at predetermined operating temperatures, best adapted for the absorption of the respective olefins by suitable circulating systems, which are arranged to maintain relatively low temperatures in the chambers where the weaker acids are employed, whereby the most reactive olefins are extracted, whereas in the chambers in which the concentrated acid is used, the circulating system is arranged to maintain a predetermined relatively high temperature to effectively produce the fixation of the less active olefins. While it is generally found preferable to introduce the gases into the absorbing chambers and carry on the sulphating operations at substantially atmospheric pressure, it is advantageous under certain conditions to maintain the gases under more or less superatmospheric pressure whereby it is possible to obtain a more concentrated solution of the olefins, and the volume of gas required to be charged through the system is correspondingly reduced, thereby permitting the utilization of smaller and less expensive apparatus.

In manufacturing products derived from the acid liquor or acid alkyl sulphates formed in the manner referred to, such for example as alcohol and esters, it is found expedient and advantageous to allow the acid alkyl sulphates formed in the absorbing chambers, together with any excess acid, to be introduced directly and immediately as it emerges from the chambers into other material such as water, in the event of the preparation of alcohol or such as calcium acetate and water in case of the preparation of esters. In this way the acid liquor is progressively and gradually added to the other materials, thereby effecting a slow mixing throughout the period that the sulphating operations are being carried on. Thus, violent reactions and excessive heats are obviated and economies of time are effected by avoiding the otherwise necessary steps of subsequently and separately mixing these ingredients. Moreover, by thus utilizing the acid liquor as soon as possible after its formation, spontaneous secondary reactions are greatly minimized, thereby largely avoiding unnecessary polymerization. The hydrolysis, or corresponding step, depending upon the product being produced, is therefore accomplished immediately and, after the process is in operation concurrently with the formation of the acid alkyl sulphate. Subsequently, the resulting mixtures are suitably treated in accordance with well known practice to eventually produce the desired derived products, as alcohols, esters, or the like.

In order to more fully disclose my invention I will now describe in detail suitable apparatus and methods of operation, using as an example of the olefin-containing gases the gaseous products resulting from the cracking of petroleum. Such gases, I have found, may contain as low a proportion of olefins as 5% or 10%, but frequently the percentage is much higher, often running in the neighborhood of 50%. The apparatus and process are equally well adapted for treating gases of either high or low olefin content and therefore may be utilized, for example, in treating hydrocarbon gases derived from vapor phase cracking which generally contain large proportions of olefins, or for treating gases produced in liquid phase cracking which may have a very low olefin content, it being only necessary to employ a larger volume in the latter case for a given yield of products. In the case of gases derived from most of the cracking systems now used, the gas may be passed directly to the reaction chambers without preliminary treatment.

The invention may best be understood from the following description of certain illustrative embodiments of apparatus suitable for practicing the improved process, and which are shown in the accompanying drawings, in which—

Fig. 1 is a view in elevation of a system of apparatus arranged in accordance with the present invention.

Fig. 2 is a view, partially in section and partially in elevation, of one of the absorbing chambers, showing particularly the construction thereof.

Fig. 3 is a diagram or chart showing graphically the relative production of certain products formed in certain of the absorbing chambers.

Figs. 4 and 5 are diagrammatic views of modified systems of apparatus particularly adapted for commercial operation.

The process may be conducted by bubbling the gases through the acid but this method of operation does not yield the best results as the comparatively short and imperfect contact is generally sufficient only to fix the most reactive olefins, and those especially prone to polymerize, but which react, while the more stable olefins escape from the reaction zone uncombined. It is, therefore preferable to use contact material over which the acid may percolate or flow in films while the gas is allowed to pass upward in counter-current relation through the percolating acid. In this manner the less reactive olefins are sufficiently contacted with the acid to produce a large yield of the desired acid alkyl sulphates.

Referring to the drawings in the form of apparatus illustrated particularly in Figs. 1 and 2, the reaction chambers for the preparation of the acid alkyl sulphate liquors assume the form of a plurality of absorbing towers or scrubbers, such as A, B, C, D, E, F, G, H, and I. Each scrubber comprises an inner tubular member 10 disposed within a cylindrical casing 11 so as to form an annular space or jacket about the reaction chamber, either for cooling or heating, as the case may be. The reaction chambers 10 are constructed of suitable acid-resisting material, such as lead, or they may be merely lined with an acid resisting substance. In the form shown they are constructed with flared ends 12 and 13 of soft metal which project outwardly and respectively engage upper and lower end flanges 14 and 15 forming parts of the casing. The lower portion of each scrubber includes a receiver portion 16 which is also provided with an upper flaring end 17 disposed adjacent the flared end 13 and in cooperative relation therewith. A lead sieve or screen 18 is provided to support contact material 19 which may be in the form of quartz pebbles, and this screen is preferably interposed between the adjacent flaring ends as shown, the various parts being detachably secured to the lower flange 15 of the casing 11 by means of a clamping ring 20 and bolts 21. The soft metal flares serve as gaskets.

The casing 11 conveniently includes a detachable upper section or flanged reducer 22 which embodies the upper flange 14, already referred to, and to which the upper flaring end 12 of the inner tubular member 10 is secured through the agency of a cover plate 23 which is held in position by suitable bolts 24. Each absorbing chamber is provided at its upper end with a receptacle or tank 25, adapted to contain sulphuric acid and is arranged to deliver the acid thereto through a pipe 26 and a sight gage 27 under the control of a regulating valve 28.

The olefin-containing gases to be treated are introduced through a line 30a to the absorbing chamber or scrubber A and then pass through the other scrubbers in succession by pipes 30b, 30c, 30d, 30e, 30f, 30g, 30h and 30i. The gas line 30a preferably enters near the bottom of the scrubber A and each of the other gas lines passes from the upper part of one scrubber to the lower part of the next in order.

The reaction between propylene, the butylenes and higher olefins with sulfuric acid to form acid alkyl sulphates is best carried on at temperatures under 30° C.; higher temperatures may be used but are undesirable due to the resulting carbonization and increase of polymerization products at the high temperatures. Heat is generated in the reactions and to obtain the most satisfactory results the reacting products should be cooled. Ethylene, on the other hand, reacts very slowly with cool acid and requires for the most efficient production of ethyl hydrogen sulphate a temperature of about 80° C. to 119° C. At higher temperatures the ethyl sulphuric acid is itself decomposed.

The apparatus is therefore arranged so that the scrubbers for propylene, the butylene and high hydrocarbons may be cooled, while the ethylene scrubbers may be heated, and in the apparatus illustrated the absorbing chambers A and B may be regarded as scrubbers for isobutylene and for isomeric butylenes, respectively, the chambers C, D, E, F and G as propylene scrubbers, and the chambers H and I as ethylene scrubbers. As illustrated, the scrubber A is equipped with a pipe 31a which communicates through a circulating pump 32 with a suitable source of cooling fluid, and discharges the cooling medium into the jacket 11 of the scrubber A. The cooling fluid circulates through the other scrubbers in succession through the pipes 31b, 31c, 31d, 31e, 31f and 31g, and is discharged from the system by the pipe 31x. If desired, the cooling medium may be run to each scrubber separately, as shown in Fig. 4. Inasmuch as substantially the same temperature may be used in both the butylene and propylene reaction chambers a rapid circulation of cooling medium through the several absorbers in series has been found to be quite satisfactory.

The ethylene scrubbers H and I are equipped with a receptacle 34 adapted to contain oil, water and other suitable heating medium and provided with a burner 33. The heated fluid passes out through the pipes 34h and 34i by which it is discharged into the heating jackets 11 of the scrubbers H and I respectively. Pipes 35h and 35i return the fluid to the receptacle 32.

The gases leaving the last propylene scrubber G may be preheated before being admitted to the first of the ethylene scrubbers. This may be accomplished by interposing in the gas line 30h a coil 36 positioned in the fluid receptacle 34. The gas line 30i may extend directly from the scrubber H to scrubber I or it may run through a heating coil 37 in the receptacle 34. The spent gases leave the last scrubber I through the line 30x.

Each scrubber is provided with an outlet pipe, as 38a, 38b, 38c, 38d, 38e, 38f, 38g, 38h and 38i, by which the liquid contents may be discharged into suitable tanks or collecting vessels 39a, 39b, 39c, 39d, 39e, 39f, 39g, 38h and 39i, said outlets preferably including valves and being in the form of goosenecks to serve as seals for the gases.

In carrying on the process for the production of the isobutyl, isomeric butyl, propyl, and ethyl acid sulphates, the several scrubbers are charged from the respective acid tanks or containers 25 with sulphuric acid of concentrations suitable for reacting with the olefins to form the respective acid alkyl sulphates. The scrubber A used for the fixation of isobutylene, is preferably charged with acid ranging from about 60% to 75% concentration, best results being obtained by the use of 65%—66% acid. The temperature of this scrubber is held at a temperature preferably not over 30° C. The absorption of the isomeric butylenes is effected in the scrubber B which is maintained at substantially the same temperature and which is charged with sulphuric acid of a concentration in the neighborhood of 85%, or at least within the range of 80% to 90% concentration. The propylene scrubbers C, D, E, F and G are ordinarily operated with acid of at least 90% concentration, preferably 94% or even stronger acid, and are also maintained at temperatures preferably under 30° C. The ethylene scrubbers H and I are charged with highly concentrated acid, such at 98% or higher, and are held at temperatures between 80° C. and 110° C., or even higher. The temperature should not ordinarily exceed 120° C. due to the liability of decomposing the ethyl sulphuric acid. 100° C. has been found to be a very satisfactory temperature.

The volume of gases passing through the system is preferably so balanced against the acid that there is at all times a reasonably large excess of acid over and above the calculated amount required to combine with the olefin content of the gases, (the percentage of olefins having been previously determined by analysis).

The olefin-containing gases are first subjected to the action of the relatively weak acid in the scrubber A. Here the higher, more reactive olefin, as isobutylene (gamma butylene) for instance, is combined to form acid alkyl sulphate as that from which tertiary butyl alcohol may be derived. The isomeric or alpha and beta butylenes are less reactive than isobutylene and will pass through the scrubber A uncombined and will be selectively absorbed in the scrubber B to form acid alkyl sulphates corresponding thereto, and from which secondary butyl alcohol may be derived.

From the absorbing chamber B, the gases are introduced into the first of the group of propylene scrubbers C, D, E, F and G, through which they are successively passed and in which strong sulphuric acid is percolated. In each of these scrubbers, a portion of the propylene content is absorbed to form isopropyl sulphuric acid from which isopropyl alcohol may be derived. The number of reaction chambers employed is so chosen as to insure the fixation of substantially all of the propylene in the gases. The isopropyl sulphuric acid formed in the several scrubbers is delivered through the respective outlet pipes into the receiving tanks 39c, 39d, 39e, 39f and 39g, or it may, if desired, be collected in a single tank 39r, as indicated in dotted lines in Fig. 1.

The gases emerging from the last propylene scrubber G and entering the first ethylene scrubber H are freed of all material quantities of olefins other than the less reactive ethylene. This ethylene-containing gas may be preheated in the coils 36 and 37 in the fluid receptacle 32 before admission to the ethylene scrubbers H and I, and on being contacted with the hot concentrated acid percolating therethrough is acted on by the acid to form ethyl sulphuric acid, from which ethyl alcohol may be derived. This ethyl sulphuric acid is delivered into the tanks 39h and 39i or may be collected in a single tank 39s, indicated in dotted lines in Fig. 1. The gases substantially freed of their olefin content leave the system through the line 30x.

From the foregoing description, it will be understood that the several olefin constituents of the gases are selectively or analytically absorbed in the order of their chemical affinity and acid alkyl sulphates corresponding thereto are produced and separately collected, and may be utilized for the preparation of desirable products derived therefrom, as alcohols, esters and the like.

In order to obtain the maximum neutralization, by the unsaturated compounds, of the strong and the concentrated sulphuric acid employed in the propylene and ethylene groups of absorbing chambers, the acid liquor and excess acid delivered into the several receiving tanks 39 of each group during any one run or passage of the gases may be supplied to the acid tanks or containers 25 of the next adjacent scrubbers of the respective groups and subsequently charged into said scrubbers during a subsequent run. This recharging is continued repeatedly throughout subsequent runs to the end that the acid is substantially neutralized and spent when it finally emerges from the first scrubber of the respective groups, beneath which is collected the highly concentrated acid liquor or acid alkyl sulphate corresponding to the olefin content absorbed in the chambers. For instance, the acid liquor delivered during one run into the tank 39i is supplied to the acid container 25h and charged into the adjacent scrubber H on the next run, whereby concentrated ethyl sulphuric acid is collected in the receiving tank 39h. A similar procedure may be carried out in connection with the several chambers of the propylene group. For instance, the acid liquor delivered from scrubber G into the receiving tank 39g during one run may in the following runs be charged in succession into the scrubbers F, E, D and C, whereby concentrated isopropyl acid sulphate is collected in the receiver 39c.

The fresh acid charged into the scrubber G may be of greater concentration than 94% if desired, since at the temperature employed, such acid does not effect the subsequent production of ethyl sulphuric acid in the ethylene scrubbers, and as substantially all of more reactive olefins have been removed from the gas, no material increase in polymerization need be feared.

While this recharging of the acid liquor and excess acid may be accomplished manually, it may be effected more advantageously in commercial operation through the agency of suitable pumps and connections. In Fig. 4 a system of apparatus is illustrated in which provision is made in connection with the propylene and ethylene groups of absorbing chambers for pumping the acid alkyl sulphates and excess acid delivered from the bottoms of the several chambers during one run into the acid containers of the next adjacent chambers from whence it is permitted to percolate through the respective chambers during the subsequent run. The general arrangement of the system is similar to that shown in Fig. 1 and already described, except that instead of circulating the cooling medium through the jackets of the several chambers in succession, arrangements are made so that each chamber is separately cooled. Moreover, suitable pumps 40d, 40e, 40f and 40g are utilized in conjunction with suitable pipe connections 41d, 41e, 41f and 41g and 42d, 42e, 42f and 42g, whereby the contents of the several receiving tanks 39d, 39e, 39f and 39g may be supplied or pumped into the next adjacent acid containers 25c, 25d, 25e and 25f. Of course, during the run or passage of the gases, the respective pumps are idle and are only started into operation to perform their intended function between successive runs. Moreover, before the pumps are operated to effect the recharging of the acid liquor, the valves 28c, 28d, 28e and 28f are closed in order to retain the acid in the acid containers after being pumped thereto. These valves are subsequently opened at the beginning of the next succeeding run to allow the acid to be supplied into the various chambers and to percolate therethrough. Fresh acid is supplied to the container 25g before each run. In this way the acid together with the absorbed olefin, forming acid alkyl sulphate, is progressively percolated through the several absorbing chambers in succession during which it accumulates or combines with increasing amounts of the olefin and becomes more and more spent until, when it reaches the absorbing chamber C, the acid has become substantially neutralized and a highly concentrated acid alkyl sulphate is delivered and collected in the receiving tank 39c. The maximum concentration of acid alkyl sulphate that is ordinarily obtainable is about 50% or 60%, and whenever the sulphate content of the sulphuric acid reaches such proportions, it is generally best to discontinue the sulphating operation. When the charge of fresh acid to one scrubber is rerun through the subsequent scrubbers, the volume of the acid liquor is increased gradually, due to the absorption of the olefin and consequently the speed of percolation must be progressively increased from scrubber to scrubber. This augmentation of the speed of percolation may be effected by suitably adjusting the control valves 28.

The group of ethylene chambers H and I are similarly provided with an intermediate pump 40i and pipe connections 41i and 42i whereby the alkyl sulphuric acid formed in the last chamber 1 and delivered to the tank 39i is recharged between successive runs into the acid container 25h associated with the next adjacent absorbing chamber H in the manner already described. The concentrated ethyl acid sulphate resulting from the treatment of the gases in the ethylene chambers is collected in the tank 39h, the acid having been substantially neutralized and spent during the successive treatments.

Referring particularly to Fig. 5 which shows a modified arrangement of the propylene scrubbers, provision is made for continuously circulating the acid together with the progressively increasing sulphate, through the several absorbing chambers of the propylene group and in which the final product is collected in tank 39c beneath the first chamber C of the group. This modified type of apparatus is generally similar to that just described, although the several acid containers 25 associated with all but the chamber G are omitted and the pumps 40d, 40e, 40f and 40g are operated to continuously and directly deliver the acid alkyl sulphate and excess acid through pipes 41d, 41e, 41f and 41g and pipes 42d, 42e, 42f and 42g to the upper ends of the next adjacent chambers. Fresh acid is supplied to the acid container 25g and as it is progressively circulated, with its accumulated or absorbed olefin, through the several chambers in succession, it becomes more and more spent until it is substantially neutralized in the first chamber C. Obviously, the group of ethylene absorbing chambers H and I may be similarly arranged and operated to produce the corresponding acid alkyl sulphate.

Having thus separately prepared the several acid alkyl sulphates corresponding to the olefin constituents in the gases, other derived products, such as corresponding alcohols, esters, etc., may be produced by suitably treating the acid alkyl sulphates in the manner now to be set forth. This subsequent treatment to produce other desirable products involves an important and advantageous step comprising bringing together or mixing the acid alkyl sulphates, as fast as they are formed, and emerge from the several chambers, with other material, such as water in the case of the preparation of alcohols, or calcium acetate and water in the case of the manufacture of esters. This water, or calcium acetate and water, is preliminarily placed in the proper receiving tanks 39 into which the respective acid alkyl sulphates are directly and immediately dropped and mixed as they emerge from the respective chambers. In this way the mixing is effected immediately and gradually, thereby avoiding violent reactions and excessive heat while economizing time otherwise necessary to perform separate and distinct mixing operations. Furthermore, by thus utilizing the liquor as soon as possible after its formation, spontaneous reactions involving unnecessary polymerization are greatly minimized and substantially avoided.

Ir manufacturing alcohols derived from the acid alkyl sulphates, water to the amount of approximately 2½ volumes to 1 volume of acid liquor is placed in the receiving tanks, and as the liquor is progressively dropped therein the usual hydrolysis gradually takes place, after which the mixture is steam distilled to yield the desired alcohols, as tertiary butyl, secondary butyl, isopropyl and ethyl alcohols.

Should it be desired to dispense with the direct mixing and hydrolyzing steps just described and to preliminarily collect the respective acid alkyl sulphates before mixing them with water, care must be taken in conducting the mixing and hydrolyzing step, as the mixing of water and acid alkyl sulphates at normal temperatures is accompanied with the generation of heat and polymerization of the acid alkyl sulphates may ensue. It is, therefore, well to effect the mixture through the use of water in the form of cracked ice, or to use other sufficiently cooled water.

As an example of the steam distillation effected after the hydrolysis has been performed, it may be stated that the resultant mixture of the water and acid liquor from the propylene scrubbers is steam distilled to a temperature of approximately 100° C., and yields a 2-layer condensate. The top layer consists of water-insoluble alcohols and light polymerization products, and the lower layer contains water-soluble alcohols. The latter are salted out by any suitable method, as by the use of potassium carbonate, and then dried. The water-insoluble condensates, frequently carry in solution more or less water-soluble alcohol and light hydrocarbons, the insoluble bodies acting as an extracting agent in the layers of partially miscible liquids of the steam distillation. These several products may be isolated, the water-soluble alcohols being recovered as isopropyl alcohol by agitation with water. The polymerization products including the heavy oil obtained from the residue of the steam distillation may be used as fuel. A similar treatment of the other acid alkyl sulphates may be utilized to produce corresponding alcohols.

The acid alkyl sulphates produced in the manner described may also serve as the basis for the formation of esters. As an illustration of the mode of procedure in making esters, the acid alkyl sulphate formed in the propylene chambers and the excess sulphuric acid is allowed to drop directly into the tanks containing commercial calcium acetate and water. The amount of water employed, I have found from experiments, to be of importance. The best yields are obtained with the use of an amount of water equal to that of the acid employed. In mixing the ingredients mentioned, the excess acid serves to liberate from the calcium acetate the strong acetic acid necessary for the production of the esters and to catalyze the reaction. The esters are finally separated from the reaction product by steam distillation.

Acetone may also be prepared from the acid liquor formed in the propylene chambers by first effecting its conversion into isopropyl alcohol in the manner already described. This isopropyl alcohol is then suitably oxidized and the acetone vapors are fractionally separated, condensed and scrubbed with sodium bisulphite to produce the desired acetone.

Referring again to the mode of analytically absorbing the various olefin constituents of the gases to form corresponding acid alkyl sulphates, and with particular reference to Fig. 1, it may under certain conditions be found unnecessary to selectively separate the isomeric butylenes (alpha and beta) from the isobutylene (gamma), in which case the second scrubber B in which sulphuric acid of approximately 85% concentration is employed, may be omitted. The gases, including the isomeric butylenes, are then passed directly from the first scrubber A to the first of the propylene group of scrubbers containing 94% acid. With such an arrangement of scrubbers the remaining olefins react vigorously with a strong sulphuric acid and large yields of products of polymerization and condensation, together with a fair yield of isopropyl acid sulphate results. The acid in this scrubber is so diluted with polymers and the acid sulphates from which the water-insoluble alcohols are derived that most of the less reactive propylene leaves the scrubber unaffected by the acid. The gases are then passed to the next scrubber D where a greatly increased yield of isopropyl sulphuric acid and a reduced amount of polymers results.

This action of the first strong acid scrubber C and subsequent scrubbers is graphically set forth in the diagram of Fig. 3 which represents average results from a number of runs in which five scrubbers were used, the first, A, for absorption of isobutylene and less reactive isomeric butylenes. Into the first scrubber A, weak acid of 61–65% concentration was used to remove the isobutylene and in the remaining scrubbers C, D, E and F acid of approximately 94% strength was employed.

In the chart of Fig. 3, the reaction of the propylene to form isopropyl acid sulphate is expressed in terms of isopropyl alcohol derived therefrom by hydrolyzing with water. In the same manner, the acid alkyl sulphates from which the water-insoluble alcohols are derived are expressed in the terms of derivative alcohols.

The chart shows that in the first strong acid propylene scrubber C, there is a relatively low production of isopropyl alcohol and comparatively large yields of polymerization products and light water-insoluble products. In scrubber D the yield of isopropyl alcohol is practically trebled, while the formation of polymers and light insoluble products is greatly reduced. In the succeeding scrubbers E and F the yields of the different products remain practically uniform or parallel. It seems to be a fact that when the gases are first contacted with the strong acid, a large yield of polymers and acid alkyl sulphates corresponding to the water-insoluble alcohols and only a relatively small proportion of isopropyl acid sulphate is formed. However, in subsequent treatments with the strong acid in the succeeding scrubbers, the yield of isopropyl acid sulphate is greatly increased and that of polymers and acid alkyl sulphates corresponding to the water-insoluble alcohols is greatly reduced.

Thus in using the apparatus under consideration in which the isomeric butylene scrubber B is omitted, the bulk of the polymerization products and water insoluble bodies are segregated in the first strong acid scrubber C and in the following scrubbers D, E and F, the acid undiluted by any large quantities of polymers or insoluble bodies is free to react with the propylene to form isopropyl acid sulphate. Any of the butylenes, such as alpha and beta butylenes, uncombined in the scrubber A, are acted on in scrubber C, so that the water-soluble alcohols derived from the propyl sulphuric acid in the scrubbers D, E and F may be isolated as practically pure isopropyl alcohol. The parallelism between the proportions of the polymers and isopropyl alcohol in the scrubbers D, E and F would seem to indicate that substantially all of the reactive higher olefins had been removed in the first two scrubbers A and C and that the relatively small amounts of polymers in the scrubbers D, E and F consisted largely of polymers of propylene.

While the invention, for illustrative purposes, has been shown and described as embodying more or less specific structural details, arrangements and locations of parts and modes of operation, it will be understood that some of the benefits and advantages thereof may be realized through the use of modified systems and processes. For instance, the construction of the reaction chambers, as well as the number and grouping thereof may be varied, while certain of the steps may be omitted or modified.

In the specification and appended claims references to sulphuric acid as the sulphating agent have been made inasmuch as that acid is particularly adapted for the process of my invention and is generally the most desirable acid to use. It is to be understood, however, that other equivalent acids may be used, such as some of the halogen sulphonic acids (e. g. chlorsulphonic and fluorsulphonic acids) and in some cases dilute nitric acid.

These and other modifications and variations may be made without departing from the spirit of my invention and the scope of the appended claims.

What I claim is:

1. The process of making acid alkyl sulphates from gases containing butylenes, propylene and ethylene which comprises treating the gases in three successive stages or steps with sulphuric acid of progressively increasing concentrations, the first two stages being conducted at cool temperatures and the last stage at a hot temperature to separately absorb the several olefins substantially in the order of chemical affinity, whereby acid alkyl sulphates corresponding to the several olefins are separately produced.

2. The process of making acid alkyl sulphates from gases containing butylenes, propylene and ethylene which comprises passing the gases successively through a series of absorbing chambers severally containing sulphuric acid of progressively increasing concentrations under varying temperature conditions such that the olefins are absorbed substantially in the order of chemical affinity and under conditions most suitable for the fixation of the respective olefins, the temperatures of the butylene and the propylene absorbing chambers being under 30° C. and that of the ethylene absorbing chambers being from 80 to 120° C., whereby acid alkyl sulphates corresponding to the several olefins are separately produced.

3. The process of making acid alkyl sulphates from olefin-containing gases which comprises passing the gases successively through a series of absorbing chambers in counter current relation to the percolation of sulphuric acid of progressively increasing concentrations and at temperatures most suitable to the fixation of the respective olefins to separately absorb the several olefins and separately produce acid alkyl sulphates corresponding thereto.

4. The process of making acid alkyl sulphates from olefin-containing gases which comprises passing the gases continuously through a plurality of series-connected absorbing chambers, percolating sulphuric acid of comparatively weak concentration under cool temperature conditions through the first portion of the chambers to absorb the more active olefins, and percolating sulphuric acid of increased concentration under higher temperature conditions through the last portion of the chambers to absorb the less active olefins, whereby acid alkyl sulphates corresponding to the several olefins are separately produced.

5. The process of making acid alkyl sulphates from olefin-containing gases which comprises passing the gas through sulphuric acid of concentration and temperature adapted for the fixation of the more reactive olefins, then passing the gases through acid of increased concentration but without substantial increase in temperature to fix the less reactive olefins, and finally passing the gases through acid of sufficiently increased concentration and temperature for the fixation of the least reactive olefins, whereby acid alkyl sulphates, corresponding to the several olefins are separately produced.

6. The process of making acid alkyl sulphates from olefin-containing gases which comprises absorbing the butylenes and the more easily polymerized products by treating the gases with a relatively weak acid maintained at a temperature not exceeding 30° C., then treating the gases with stronger acid but without substantial increase in temperature to absorb the propylene, and finally treating the gases with a relatively concentrated sulphuric acid and at materially greater temperatures to absorb the ethylene, whereby acid alkyl sulphates corresponding to the several olefins are produced.

7. The process of making acid alkyl sulphates from olefin-containing gases which comprises preliminarily removing the butylene content of the gases by absorption in weak sulphuric acid and then passing the gases successively throughout a particular run through a plurality of absorbing chambers severally containing sulphuric acid of a concentration of about 94% and at a temperature of not over 30° C. to absorb the propylene, subsequently charging the acid alkyl sulphate and excess acid from the several chambers into the next adjacent chambers and passing the mixture therethrough throughout the next run or passage of the gases, and continuing this recharging step throughout a plurality of runs and finally collecting the concentrated isopropyl acid sulphate from the endmost chamber of the series.

8. The process of making acid alkyl sulphates from liquid olefin which comprises passing still gases through the liquid olefin whereby the volatilized liquid is taken up by the gases, and then passing the gases including the volatilized olefin through a chamber containing sulphuric acid of a concentration and temperature adapted to absorb the olefin from the gases to produce an acid alkyl sulphate corresponding thereto.

9. The process of making acid alkyl sulphate and alcohol derived therefrom which comprises passing olefin-containing gases through an absorbing chamber, percolating through said chamber in counter current relation to said gases, sulphuric acid of concentration most suitable for the fixation of a definite olefin, whereby the olefin is selectively absorbed to form a corresponding acid alkyl sulphate, dropping the acid alkyl sulphate as fast as it is formed into water whereby a hydrolyzing action is gradually effected, and subsequently treating the mixture to produce alcohol corresponding to the olefin absorbed by the acid.

10. The process of making acid alkyl sulphate from olefin-containing gases which comprises passing the gases in succession through a series of connected absorbing chambers arranged in groups severally containing sulphuric acid of progressively increasing concentrations and at temperatures most suitable to the fixation of the respective olefins in the order of chemical affinity, and separately collecting the acid alkyl sulphates formed in the respective groups of chambers and corresponding to the several olefins selectively absorbed from the gases.

11. The process of making acid alkyl sulphates from gases containing buthylenes and propylene which comprises passing the gases through a plurality of series-connected chambers, contacting the gases in certain of said chambers with weak sulphuric acid at a temperature not above 30° C. for the absorption of the butylenes, and subsequently contacting the gases in other chambers with sulphuric acid of increased concentration and at a temperature not above 30° C. for the absorption of the propylene whereby corresponding acid alkyl sulphates are separately produced.

12. The process of making acid alkyl sulphates from gases containing butylenes and propylene which comprises passing the gas through a plurality of series-connected chambers, contacting the gases in certain of said chambers with sulphuric acid of 65%–85% concentration and in certain succeeding chambers with sulphuric acid of 90% to 94% concentration, and maintaining the temperature in all the chambers at not over 30° C., whereby the butylenes and the propylene are absorbed in the order of their chemical affinity and corresponding acid alkyl sulphates are separately produced.

13. The process of making acid alkyl sulphates from gases containing butylenes and propylene which comprises passing the gases through a plurality of series-connected chambers, contacting the gases in certain of said chambers with sulphuric acid of 60% to 75% concentration, in the next succeeding chamber with sulphuric acid of 80–90% concentration, and in succeeding chambers with sulphuric acid of in the neighborhood of 94% concentration, while maintaining all of said chambers at a constant temperature of not over 30° C., whereby the isobutylene, the insomeric (alpha and beta butylenes and the propylene are absorbed in order and corresponding acid alkyl sulphates are separately produced.

14. The process of making acid alkyl sulphates from olefin-containing gases which comprises subjecting the gases to the absorbing action of sulphuric acid of 65–85% concentration and at a temperature of not over 30° C. for the fixation of the butylene content thereof, then subjecting the gases to the action of sulphuric acid of about 94% concentration and a temperature of not over 30° C. for the fixation of the propylene content, and finally subjecting the gases to sulphuric acid of about 98% and at a temperature of 80°–120° C. for the fixation of the ethylene content whereby the olefins in the gases are absorbed in the order of their chemical affinity to produce acid alkyl sulphates corresponding thereto.

15. The process of making acid alkyl sulphates from olefin-containing gases, which comprises passing the gases through a series of absorbing chambers for successive treatment therein, contacting the gases by counter current flow in the chambers of sulphuric acid at progressively increasing concentration and at temperatures most suitable for the fixation of the respective olefins to absorb the several olefins separately and independently produce acid alkyl sulphates corresponding thereto, while maintaining a superatmospheric pressure upon the gases and the sulphuric acid throughout the treatment.

16. The process of making alcohol that comprises producing acid alkyl sulphate by contacting the olefin-containing gases with sulphuric acid, progressively hydrolyzing said sulphate by dropping said sulphate as fast as it is formed into water and subsequently treating the mixture thus gradually effected to produce alcohol corresponding to the olefin content of the acid alkyl sulphate formed.

17. In the process of making acid alkyl sulphates from gases containing butylenes and propylene, the steps comprising first removing by absorption in sulphuric acid the butylene content of the gases, and thereafter passing the gases into contact with sulphuric acid of higher concentration and at a temperature suitable for the absorption of the propylene, whereby the corresponding acid alkyl sulphates are separately produced.

18. In the process of treating gases derived from the pyrogenic decomposition of hydrocarbon oils and containing substantial amounts of olefines, the steps comprising absorbing the butylenes and the more easily polymerized products by treating the gases with a relatively weak acid maintained at a temperature not exceeding 30° C., and thereafter treating the gases with stronger acid under a temperature suitable for the absorption of propylene, whereby the corresponding acid alkyl sulphates are separately produced.

In witness whereof I have hereunto set my hand and seal this 6th day of June 1921.

RENÉ DE M. TAVEAU.